Dec. 16, 1924. 1,519,162

A. NORIN

TIRE

Filed March 23, 1923

Inventor
Adolf Norin

Patented Dec. 16, 1924.

1,519,162

UNITED STATES PATENT OFFICE.

ADOLF NORIN, OF MILWAUKEE, WISCONSIN.

TIRE.

Application filed March 23, 1923. Serial No. 627,030.

*To all whom it may concern:*

Be it known that I, ADOLF NORIN, a citizen of the United States, and resident of Milwaukee, in the county of Milwaukee and State of Wisconsin, have invented certain new and useful Improvements in Tires; and I do hereby declare that the following is a full, clear, and exact description thereof.

This invention relates to tires and is particularly directed to a spring cushion tire.

Objects of this invention are to provide a spring tire which is so constructed that the stresses are distributed over a large area to thereby prevent excessive localization such, for example, as would normally occur when the tire passes over a relatively sharp projection, to provide a spring tire in which not only the stresses tending to press the tire inwardly are distributed, but in which the outward bowing of any of the several spring members is transmitted as well to a number of adjacent spring members, and to provide a spring tire in which the resilient elements are interwoven without producing any lateral distortion of the elements.

Further objects are to provide a spring tire which is light in weight, which may be readily constructed and which will be highly effective in operation.

An embodiment of the invention is shown in the accompanying drawings, in which:—

Figure 2:
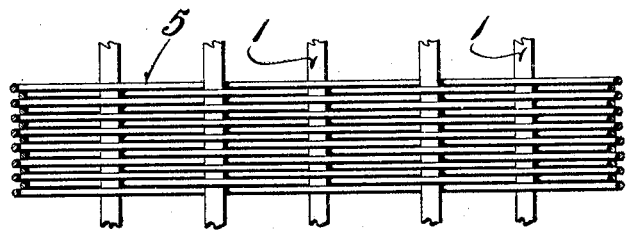
Figure 2 is a fragmentary view of the interwoven spring elements.
Figure 3:
Figure 3 is a longitudinal sectional view through the spring elements.

The tire is formed of a plurality of spring elements 1 which are of rectangular cross section, as illustrated in Figures 2 and 3 and which, when in position, correspond to the cross sectional, or transverse contour of the tire. These elements have reversely curved ends 2 which, when in position, are in abutting relation to the upturned portions 3 of a metallic strip 4 which is adapted to pass continuously completely around the rim of a wheel. The members 1 are held in the correct position and are reinforced by longitudinally or peripherally extending resilient elements 5 which, in the form shown, may be resilient wires. These wires or resilient members extend completely around the tire in a longitudinal or peripheral manner and are interwoven with the bars 1. This structure is the main resilient structure of the tire and is adapted to be housed in an appropriate casing.

Figure 1:
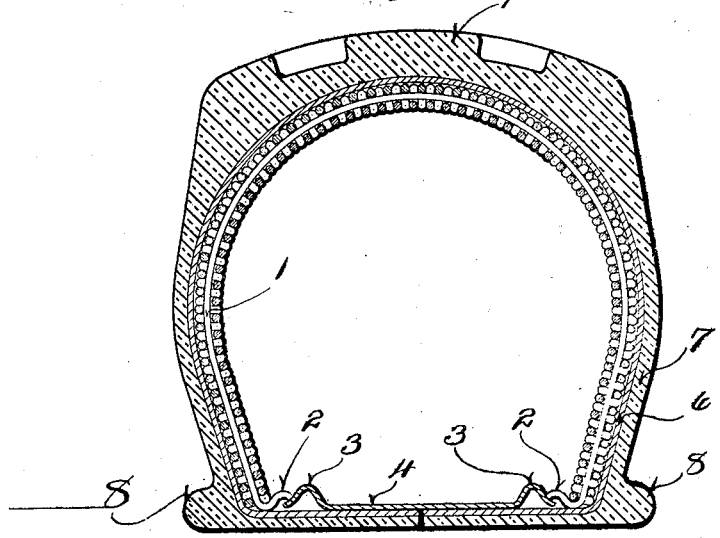
Figure 1 is a transverse sectional elevation of a tire, showing the position of the resilient elements.

As shown in the drawings, the resilient portions may be encased within a canvas, or other fabric sheath 6 and upon the outer side of such fabric sheath, the usual rubber, or other casing 7 may be positioned, such outer sheath being provided with outwardly extending attaching ribs 8 and with a suitable tread surface 9, as shown in Figure 1.

The composite resilient structure of the tire tends to remain in a flat condition and may be readily inserted within the casing by suitably bowing it and slipping it in place. The tendency to expand outwardly is resisted, of course, by the flanged portions of the wheel in the usual manner, in turn holding the parts in the position shown in Figure 1.

It will be seen, therefore, that a resilient tire, or spring tire, has been provided in which the longitudinally extending resilient strands 5 are not distorted laterally, but are interwoven with the bars 1 without such lateral distortion. It is also to be noted that the bars 1 are preferably more widely spaced than the strands 5, the strands lying in close proximity to each other.

It is to be particularly noted that in forming this resilient member, the strand 5 may consist of a single wire continuously woven with the bars 1 completely around the tire, such strand passing continuously and in the same direction around the tire. This provides a very ready and serviceable method of forming the resilient fabric.

It will be seen from the detailed description that when a single relatively sharp obstruction is encountered, such for instance, as a projecting rock from the roadway, that the upward pressure against the tire is communicated to a large portion of the tire. From actual tests it has been found that this stress is communicated to approximately two-thirds of the tire.

It is to be noted that any localized pressure is prevented from producing unusual stresses at any given point, but that such stresses are transmitted over a relatively wide area and are distributed among a plurality of resilient members, thereby preventing excessive distortion at any point in the structure and, consequently, avoiding rapid crystallization.

It is to be noted further that not only is the inwardly acting force distributed, but that the outward bowing of any of the bars is transmitted to a plurality of adjacent bars and to the resilient strands, or wires 5.

I claim:—

1. A spring tire comprising a plurality of relatively widely spaced resilient flat bars corresponding to the cross sectional contour of the tire, a plurality of relatively closely spaced longitudinally extending, parallel, resilient wires interwoven with said bars, a plate having flanged portions spacing the ends of said bars apart, and a casing housing said bars and wires, said wires being of lighter construction than said bars and said bars being uniformly smoothly flexed throughout.

2. A spring tire comprising a plurality of relatively widely spaced resilient flat bars corresponding to the cross sectional contour of the tire, a plurality of relatively closely spaced longitudinally extending, parallel, resilient wires interwoven with said bars, a plate having flanged portions spacing the ends of said bars apart, and a casing housing said bars and wires, said wires being formed of a single continuous strand throughout their extent.

In testimony that I claim the foregoing I have hereunto set my hand at Milwaukee, in the county of Milwaukee and State of Wisconsin.

ADOLF NORIN.